United States Patent [19]
Orlamünder

[11] Patent Number: 6,119,841
[45] Date of Patent: Sep. 19, 2000

[54] WRAP SPRING CLUTCH

[75] Inventor: Andreas Orlamünder, Schweinfurt, Germany

[73] Assignee: Mannesmann Sachs AG, Schweinfurt, Germany

[21] Appl. No.: 09/236,058

[22] Filed: Jan. 22, 1999

[30] Foreign Application Priority Data

Jan. 22, 1998 [DE] Germany .......................... 198 02 251

[51] Int. Cl.⁷ ................................................. F16D 11/06
[52] U.S. Cl. ..................................... 192/81 C; 192/55.61
[58] Field of Search .............................. 192/81 C, 55.61, 192/101, 89.21

[56] References Cited

U.S. PATENT DOCUMENTS

| | | | |
|---|---|---|---|
| 4,176,737 | 12/1979 | Roberts | 192/82 T |
| 4,465,171 | 8/1984 | Koyama | 192/81 C |
| 4,674,612 | 6/1987 | Ogura | 192/48.92 |
| 5,881,855 | 3/1999 | Putney et al. | 192/35 |
| 5,941,360 | 8/1999 | Putney et al. | 192/150 |

FOREIGN PATENT DOCUMENTS

| | | |
|---|---|---|
| 0 148 424 | 7/1985 | European Pat. Off. . |
| 63-783 | 3/1921 | Japan . |
| 32-1308 | 10/1928 | Japan . |
| 1 152 824 | 5/1969 | United Kingdom . |
| 2 079 874 | 1/1982 | United Kingdom . |

*Primary Examiner*—Rodney H. Bonck
*Assistant Examiner*—Tisha D. Waddell
*Attorney, Agent, or Firm*—Cohen, Pontani, Lieberman & Pavane

[57] ABSTRACT

A wrap spring clutch having a first component rotatable around a rotary axis, a second component rotatable around the rotary axis, and a wrap spring arrangement, which is held in a substantially rotation-proof manner on one of the two components relative thereto and is at connective rest or can be brought into connective rest on a circumferential surface of the other of the two components to establish a rotary connection between the first and second components. The wrap spring arrangement is at connective rest with a first spring section on a circumferential surface of the first component for torque transmission and is at connective rest with a second spring section on the circumferential surface of the other component.

19 Claims, 8 Drawing Sheets

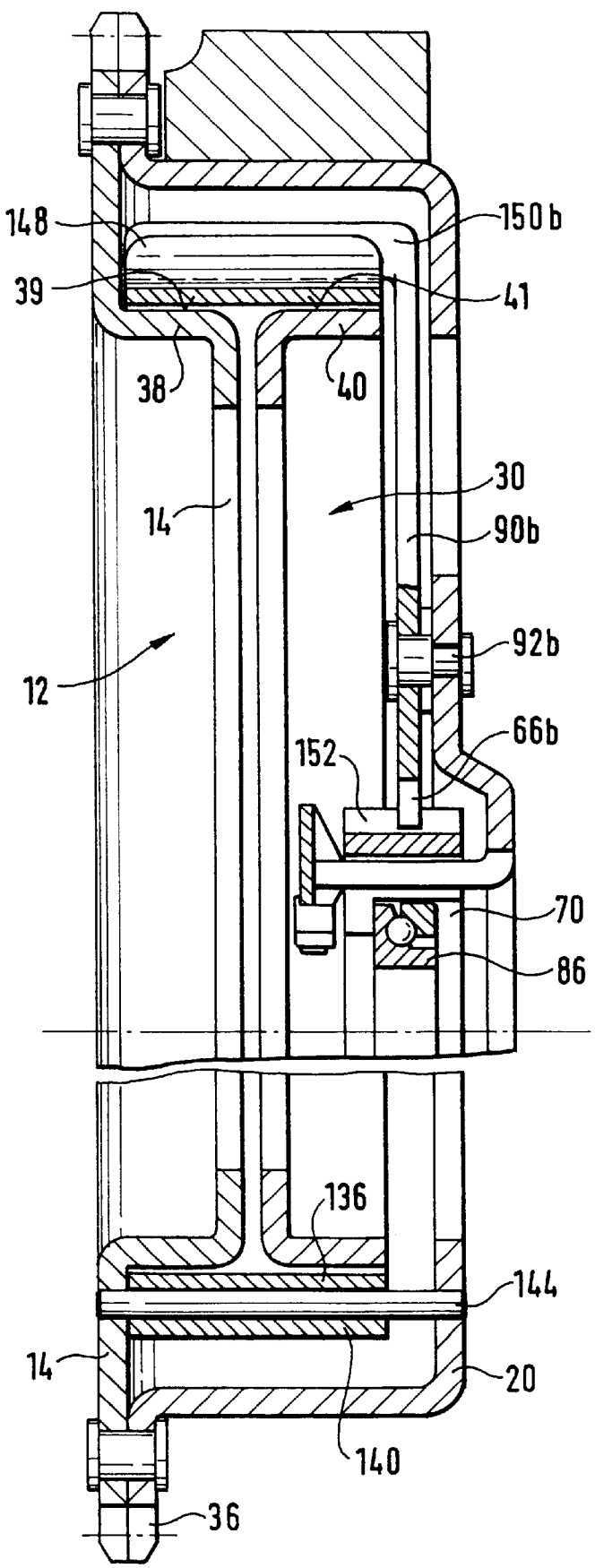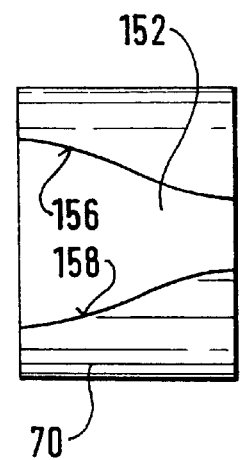
FIG. 15
FIG. 16

WRAP SPRING CLUTCH

BACKGROUND OF THE INVENTION

1. Field of the Invention

The present invention relates to a wrap spring clutch, especially for arrangement in the drive train of a motor vehicle. Such a clutch includes a first component rotatable around a rotary axis, a second component rotatable around the rotary axis, and a wrap spring arrangement held on one of the two components in a substantially rotation-proof fashion relative thereto.

2. Discussion of the Prior Art

Such wrap spring clutches are known from the prior art, in particular, for use in the drive train of motor vehicles. These clutches generally have a first component in the form of an input part connected to the crank shaft of an internal combustion engine. The first component further comprises a centrifugal mass part as well as a housing, which, in areas, surrounds the clutch arrangement. A second component of the wrap spring clutch is held in rotation-proof fashion on a gear input shaft. The second component comprises a part embodied substantially cylindrically. The cylindrical circumferential surface of the second component is surrounded by a wrap spring wound in coil-like fashion. The wrap spring, at its first end, is secured to the first component by a bolt or the like. At its second end, the wrap spring interacts with a disengagement lever, located on the housing, that can be pivoted around an axis approximately parallel to the rotary axis of the wrap spring clutch. When the disengagement lever is in a non-pressurized position, the wrap spring contracts and produces a normal force on the cylindrical outer surface of the second component. This normal force is reinforced by a self-locking effect that occurs during torque transmission.

In this known wrap spring clutch, the problem exists that the interaction area of the wrap spring with the second component extends over substantially the entire circumferential surface of the second component and is thus relatively large, whereas the wrap spring is securely connected to the first component only by means of the attachment bolt. This means that high loads can occur during torque transmission, particularly in the connection area, which can in turn lead to damage in this area in the event of relatively large torque fluctuations or impacts.

SUMMARY OF THE INVENTION

The object of the present invention is therefore to provide a wrap spring clutch in which approximately even load distribution occurs, so that the danger of damage to overloaded areas is avoided.

According to the invention, this object is attained by means of a wrap spring clutch, especially for arrangement in the drive train of a motor vehicle, comprising a first component rotatable around a rotary axis, a second component rotatable around the rotary axis, and a wrap spring arrangement held on one of the two components in a substantially rotation-proof fashion relative thereto, which, to establish a rotary connection between the first and second components, is at connective rest or can be placed into connective rest on a circumferential surface of the other component.

Further, in the wrap spring clutch according to the invention, the wrap spring arrangement is at connective rest or can be brought into connective rest on a circumferential surface of the first component with a first spring section, for the purpose of torque transmission, while also being at connective rest or movable into connective rest on the circumferential surface of the other component with a second spring section.

Thus, in the wrap spring clutch according to the invention, the torque transmission connection of the wrap spring to both the first and the second components is established by the action of these components on the respective circumferential surfaces, using the normal force produced by the wrap spring, which force, during torque transmission, is further reinforced by the self-locking effect. It is thus possible to avoid the points of stress found in the wrap spring arrangement known from the prior art, particularly in the connection area of the first component (which may be, for example, an input component in a drive train).

However, to hold the wrap spring arrangement in a defined position relative to the first component, it is also advantageous for the wrap spring arrangement to be held in a substantially rotation-proof fashion in the area of a spring end near the first spring section, preferably by engagement into a fixing recess on the first component.

To permit the wrap spring arrangement to interact evenly with both components, in another embodiment of the invention the circumferential surface of the first component and the circumferential surface of the other component are substantially aligned with each other in the axial direction.

The wrap spring arrangement preferably comprises at least one wrap spring embodied in a coil-like fashion.

In the wrap spring clutch known from the prior art, the wrap spring is embodied as a spring wound in a coil-like manner. To produce sufficient connecting force with such a spring embodiment, the spring must have a certain minimum number of windings. Accordingly, the result is an axially elongated configuration of the overall wrap spring clutch.

According to a further aspect of the present invention, the wrap spring arrangement comprises a wrap spring embodied in a spiral-like manner.

Furthermore, when the wrap spring embodied in a spiral-like manner extends around the rotary axis with an angular extension area of more than 360 degrees, it is again possible, upon establishment of the connected state, to produce a self-locking effect, which, in addition to the normal force produced by the spring, reinforces the torque transmission connection.

The arrangement of the disengagement lever in the wrap spring clutch known from the prior art results in the wrap spring clutch having an asymmetrical structure relative to the rotary axis. To avoid eccentric running during operation, additional compensating weights must be provided. This is not only difficult, but can also lead to unsatisfactory concentric running, because the disengagement lever assumes different pivot positions—and thus different centers of gravity relative to the rotary axis—depending on whether the clutch arrangement is in the disengaged or engaged state.

Therefore, according to a further embodiment of the present invention, the wrap spring clutch has a disengagement organ, which is connected to the wrap spring arrangement and can be operated for the purpose of establishing or eliminating the action of the wrap spring arrangement on the other component. The disengagement organ comprises an annular disengagement element that can be rotated around the rotary axis for the purpose of establishing or eliminating the action of the wrap spring arrangement on the other component.

By providing an annular disengagement element, it is possible to avoid imbalances during operation, because the mass distribution remains the same at all times regardless of the rotational position of the ring element.

It is thereby preferable that the annular disengagement element for establishing or eliminating the action of the wrap spring arrangement on the other component be rotatable at least relative to the first component. For example, the annular disengagement element can be held, so as to be rotatable around the rotary axis, on a housing connected in rotation-proof fashion to the first component.

In the wrap spring clutch known from the prior art, disengagement of the clutch is produced by pivoting the disengagement lever. To bring about this pivot movement, a disengagement cap is held on the gear input shaft in an axially movable but rotation-proof fashion relative thereto. Upon axial movement of the disengagement cap toward the disengagement lever, the lower end of the disengagement lever slides on the spherical outer surface of the disengagement cap and is thereby pivoted. This leads to the problem that, in the disengaged state, in which a relative rotation occurs between the first and second components, the disengagement lever slides permanently on the outer surface of the disengagement cap. Thus, disproportional wear can be produced in this area of these components.

Therefore, according to a further aspect of the present invention, the wrap spring clutch also comprises an operating organ for operating the disengagement organ. To operate the disengagement organ, the operating organ can be moved in the direction of the rotary axis by means of a disengagement force production device. The operating organ also has an activation surface that, upon axial movement, pressurizes an activation section of the disengagement organ. Between the operating organ and the disengagement force production device, there is a rotary disconnection bearing arrangement for the rotary disconnection of the disengagement force production device and the operating organ.

The operating organ is preferably held in a substantially rotation-proof fashion relative to the first component.

To activate the disengagement organ, the operating organ can have at least one activation surface running in a coil-like manner on its outer circumferential surface.

The activation surface(s) running in a coil-like manner can be formed, for example, by a side wall of a substantially thread-like depression in the outer circumference of the operating organ.

As mentioned, the wrap spring arrangement known from the prior art has the advantage that, during torque transmission in a certain direction, self-locking that reinforces the connective force occurs due to the contraction of the wrap spring. However, if the torque transmission direction is reversed, for example, if a tension state becomes a thrust state, the self-locking is eliminated. At the same time, the wrap spring elevates from the circumferential surface, particularly in the transition area between the two components, and can be damaged in this area by deformation or the like.

Therefore, according to a further aspect of the present invention, the wrap spring clutch has a support arrangement with a support surface, which is arranged directly adjacent to the wrap spring arrangement and on the radial side of the wrap spring arrangement that is opposite to the circumferential surface of the second component and, as applicable, the first component.

In other words, the wrap spring arrangement is "sandwiched" in the radial direction between the circumferential surface of the first or second component, on the one hand, and the support surface of the support arrangement, on the other. If the torque introduction direction is reversed, the wrap spring arrangement, upon elevating from the circumferential surface of the first or second component, can rest, in the transition area between these components on the other radial side, on the support surface of the support arrangement. This prevents the wrap spring arrangement from becoming excessively deformed in this area.

The effect of the support arrangement can be achieved very efficiently when the support surface rests on the wrap spring arrangement at least in an engaged state of the wrap spring clutch.

To eliminate the torque transmission contact of the wrap spring arrangement with the respective circumferential surfaces, it is proposed that, in a disengaged state of the wrap spring clutch, the contact of the support arrangement with the wrap spring arrangement be eliminated at least in some areas.

To keep the number of required components as low as possible, it is proposed that this contact of the support arrangement be eliminated by the disengagement organ.

The embodiment can be such, for example, that the disengagement organ, upon disengagement of the wrap spring clutch, initially eliminates the contact of the support arrangement with the wrap spring arrangement at least in some areas and only then ends the action state of the wrap spring arrangement on the second component.

To achieve the greatest possible protection for the wrap spring arrangement by means of the support arrangement, the support arrangement comprises a support element extending in the circumferential direction substantially completely along the wrap spring arrangement.

To counteract the problem of overload of the wrap spring arrangement upon reversal of the torque transmission direction, according to an alternative embodiment of the present invention, the wrap spring arrangement comprises a first wrap spring part, which extends in a first circumferential section along the circumferential surface of the second component, and a second wrap spring part, which extends in a second circumferential section along the circumferential surface of the second component. The first and second wrap spring parts, in the area of their first, substantially adjacent ends, are held on the first component and, in the area of their second ends, are embodied for interaction with a disengagement organ.

In such an embodiment, one wrap spring part, which contributes substantially to the torque connection, is thus provided for each torque transmission direction. The deformation of any area of the wrap spring arrangement can thus be avoided, because torque transmission is ensured via tension of the respective halves.

To provide the strongest possible torque connection, the first and second wrap spring parts together extend substantially completely around the rotary axis along the circumferential surface of the second component. In such an embodiment, to ensure that an adequate contact force is produced on the circumferential surfaces by the wrap spring parts, prestress means are provided which preferably act on the first and the second wrap spring parts in the areas of their respective second ends and prestress the first and second wrap spring parts in contact at least with the circumferential surface of the second component.

Further, in a different embodiment, the first and/or second wrap spring part can act with a first spring section on a circumferential surface of the first component and can act with a second spring section on the circumferential surface of the second component.

As described above, it is necessary, during the operation of wrap spring clutches, to move a disengagement organ in the circumferential direction, in order to elevate one end of the wrap spring arrangement from the given circumferential surface. As noted above, this can be undertaken by the reciprocal sliding on each other of different control surfaces and control sections. When this is done, however, the friction contact thus produced leads to an increase in the force required for operation. To avoid this, it is proposed according to a further aspect of the present invention to have a wrap spring clutch that comprises an operating arrangement for the operation of the disengagement organ. The operating arrangement has an input area that can be moved substantially axially to produce an operating force, as well as an output area that is connected to the input area and can be moved in the circumferential direction, upon the axial movement of the input area, around the rotary axis.

This means that the axial movement of one component is converted directly into a radial movement of a second component to operate the disengagement organ. The intermediate connection of areas that rub against each other is no longer necessary.

In still a further embodiment the operating arrangement is embodied in substantially annular fashion, and the input area comprises at least one, and preferably more, tongue sections that extend axially away from the annular operating arrangement in the circumferential direction. These tongue sections can be axially pressurized by a disengagement force production arrangement. The output section is connected in a substantially rotation-proof fashion to the disengagement organ or is embodied integrally therewith.

To ensure reliable interaction and even distribution of the disengagement force, several tongue sections can be provided so that the multiple tongue sections extend in the same circumferential direction.

Further, it is possible for the multiple tongue sections to extend away from the operating arrangement in only one axial direction.

Alternatively, it is possible for the multiple tongue sections to be divided so that some of them extend away from the operating organ in one axial direction, while the others extend away from the operating organ in the opposite axial direction. In such an embodiment, the occurrence of friction contact between any components can be completely avoided.

To ensure that the produced rotary movement is transmitted completely to the output section, in an additional embodiment, each tongue section rests in the area of its free end on a contact surface that is held in a substantially rotation-proof fashion relative to the first component. Also, each tongue section is blocked in the contact area in at least one direction against movement in the circumferential direction.

Preferably, in the wrap spring arrangement according to the invention, a torsional vibration damper arrangement is provided in the case of at least one of the two components.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 15 is a partial longitudinal section of the wrap spring clutch shown in FIG. 14;

FIG. 16 shows an operating organ for a disengagement organ of the wrap spring clutch in FIGS. 14 and 15;

DETAILED DESCRIPTION OF THE PREFERRED EMBODIMENTS

Figure 1:
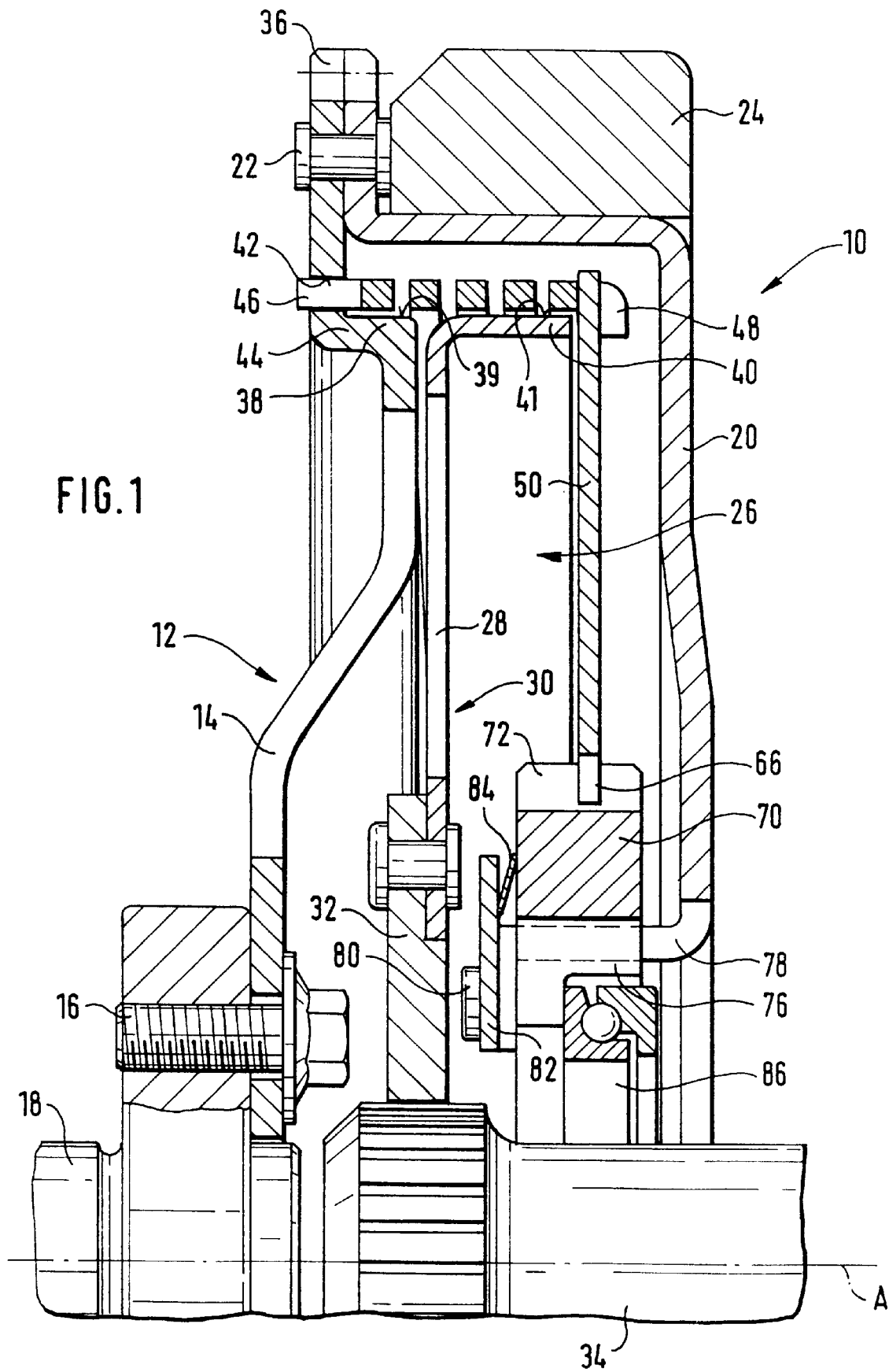
FIG. 1 is a partial longitudinal sectional view of a wrap spring clutch according to the invention.

FIGS. 1 through 5 show a first embodiment of a wrap spring clutch 10 according to the invention. The wrap spring clutch 10 comprises a first component 12 as an input component, which has a disk part 14, which is attached on the radial inside by bolts 16 to a crank shaft 18 and is thus rotatable therewith around a rotary axis A. On the radial outside, a housing part 20 is connected in rotation-proof fashion to the disk part 14 and carries an annular mass part 24. Between the disk part 14 and the housing part 20 is the interior 26 of the wrap spring clutch 10, wherein a disk part 28 of a second or output component 30 of the wrap spring clutch 10 is arranged. On the radial inside, the disk part 28 is connected in rotation-proof fashion to a hub disk 32, which is held in rotation-proof fashion on a gear input shaft 34 or the like.

In their radially outer areas, which rest on each other, the disk part 14 and the housing part 20 form a starter ring gear 36, which is advantageously produced during the stamping process for these parts, which are generally made of sheet metal.

In their radially outer areas, the disk parts 14, 28 have substantially axially extending cylindrical circumferential sections 38, 40 with circumferential surfaces 39, 41, which are formed in these two parts during the forming procedure. A wrap spring 44 engages with an end section 46 into an axial opening 42 of the disk part 14, and is thus held in rotation-proof fashion in this area relative to the disk part 14 and the first component 12. The wrap spring 44, which, in the example shown, constitutes the wrap spring arrangement, rests on the outer circumferential surface 41 of the cylindrical section 40 of the disk part 28. The wrap spring 44 is embodied in such a way as to produce, due to its spring prestress force, a normal contact force on the outer circumferential surface 41 of the cylindrical section 40 and thus normally to establish a connective state between the input part 12 and the output part 30.

To allow release of the connected state, the opposite end 48 of the wrap spring 44 is securely connected to a disengagement ring element 50. The disengagement ring element 50 (FIGS. 2 and 3) comprises an outer ring section 52, which is connected via spokes 54 to an inner ring section 56. In the outer ring section 52, there is a notch 58, into which the end 48 of the wrap spring 44 engages. As shown in FIG. 2, multiple bearing bolts 60 are provided on the housing part 20 of the wrap spring clutch 10. The bearing bolts 60 are distributed in the circumferential direction and, with their heads 62, grip behind the outer ring section 52 from the inside. Between the housing part 20 and the disengagement ring element 50, there is a sliding surface cover 64, which permits a slight rotation of the disengagement ring element 50 relative to the housing part 20. In the embodiment according to FIGS. 1 through 3, for example, four such bearing bolts 60 are provided, each of which is arranged between two of the spokes 54. In the same way, three or another number of bolts can also be provided.

To eliminate the action of the wrap spring 44 on the outer circumferential surface 41 of the cylindrical section 40, the disengagement ring element 50 can be rotated in the circumferential direction around the rotary axis A. In addition, the disengagement ring element 50 has multiple carrier projections 66, which project radially inward from the inner ring section 56 and engage into spiral circumferential grooves 68 of an operating element 70. For each projection 66, there is a complementary spiral circumferential groove 68, which forms, with its lateral surfaces 72, activation surfaces via which the projections 66 can be pressurized for the purpose of rotating the disengagement ring element 50.

The operating element 70 has projections 74 that project radially inward and form recesses 76 between themselves. Into each of the recesses 76, an axially curved journal 78 of the housing part 20 engages so that the operating element 70 is held on the housing part 20 in rotation-proof fashion, but axially movable relative thereto.

Figure 2:
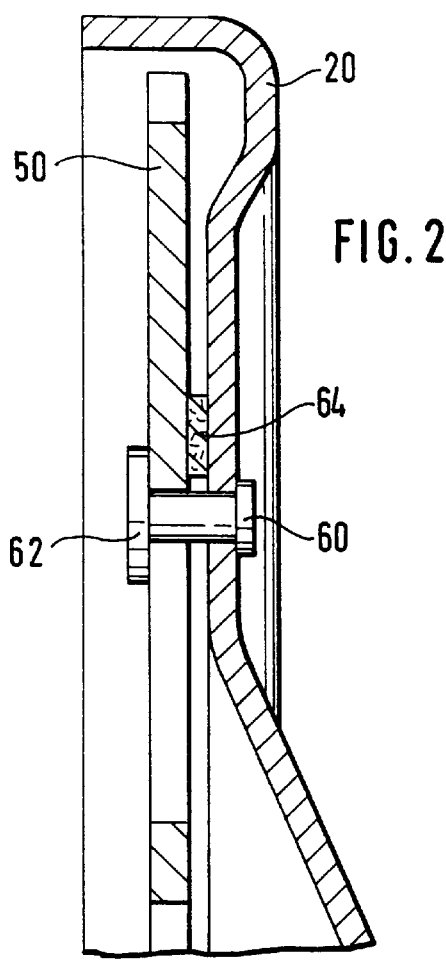
FIG. 2 is an enlarged view of an area of the wrap spring clutch in FIG. 1, showing a disengagement organ held in rotatable fashion on a clutch housing.
Figure 3:
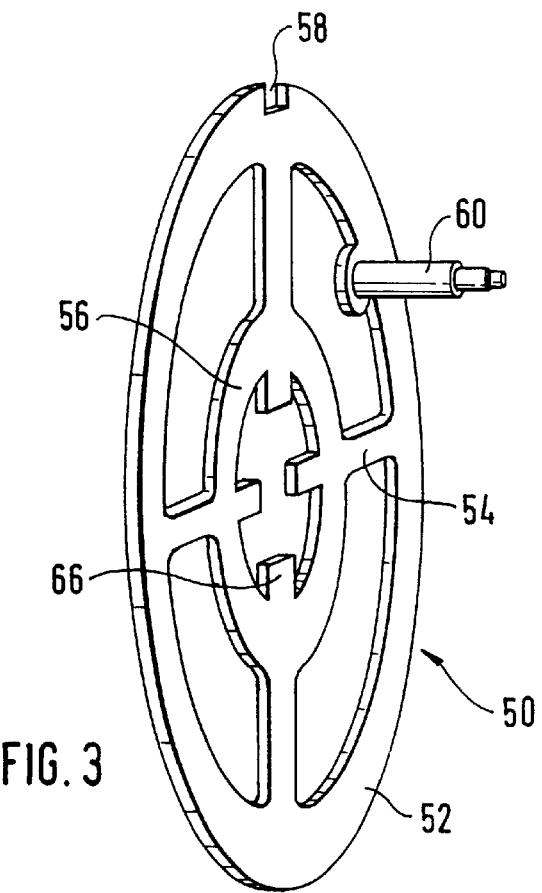
FIG. 3 shows an annular disengagement organ.
Figure 4:
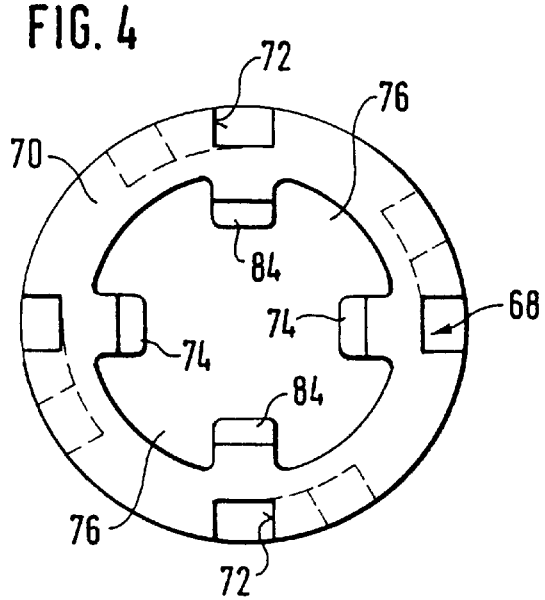
FIG. 4 is an axial view of an operating element for the disengagement organ.
Figure 5:
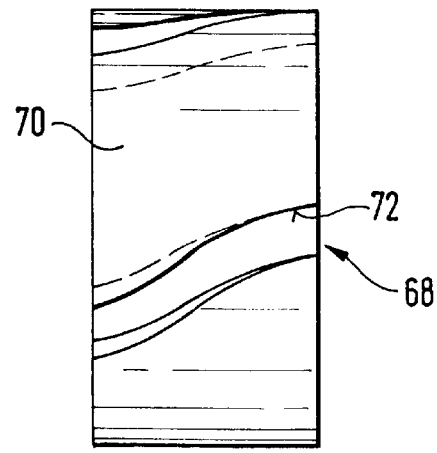
FIG. 5 is a view of the operating element in FIG. 4 from the outside.

Secured to one inner end of the curved journal 78 by bolts 80 is a counter bearing plate 82, on which rests a prestress spring 84 (e.g., a cup spring or the like) that presses against the operating element 70 and prestresses the operating element 70 axially to the right in FIG. 1. A disengagement bearing 86, which comprises two bearing shells and multiple bearing bodies held between these bearing shells, acts on an inner area 84 of the projections 74 of the operating element 70. The disengagement bearing 86 can be axially pressured by a disengagement force production arrangement, for example, a clutch release lever or the like, whereby the disengagement bearing 86 provides a rotary disconnection between the operating element 70 and the disengagement force production arrangement.

If the disengagement bearing 86 in FIG. 1 is moved to the left, it takes along the operating element 70 against the force of the prestress spring 84. This axial movement, because of the spiral activation surfaces 72 of the circumferential grooves 86, causes the projections 66 on the disengagement ring element 50 to move in the circumferential direction, which results in a corresponding rotation of the disengagement ring element 50. Upon this rotary movement, which occurs against the axial pressure effect of the prestress spring 84, on the one hand, and against the contracting force of the wrap spring 44, on the other, the wrap spring 44 spreads out, so that its contact force on the circumferential surface 41 of the cylindrical section 40 is reduced or completely eliminated. Rotary disconnection is thus provided between the first component 12 and the second component 30. If the disengagement bearing 86 is released, then, because of the prestress effect of the prestress spring 84 and the contracting effect of the wrap spring 44, the operating element 70 moves back into its initial position to the right in FIG. 1, which corresponds to an engaged state of the wrap spring clutch 10.

In the wrap spring clutch shown in FIGS. 1 through 5, the provision of a disengagement ring element 50 as a disengagement organ makes it possible to provide a symmetrical structure around the rotary axis A with respect to the distribution of mass, so that any possible imbalances can be avoided during operation. Furthermore, because the disengagement bearing 86 provides a rotary disconnection between the operating element 70 for the disengagement ring element 50 and the clutch release lever, it is possible to avoid any friction contact between these components in the engaged or disengaged state of the clutch.

The different components of the wrap spring clutch 10, e.g., the disk parts 14, 28, the housing part 20 and the like, can be stamped from sheet metal in an economical and simple manner. Moreover, as described above, the starter ring gear can be embodied integrally with the disk part 14 and the housing part 20 during the stamping procedure.

The use of wrap spring clutches provides a compact structure, in which, because the connecting forces act relatively far radially outside, even relatively small normal forces produce a sufficient connecting force. All friction contacts, i.e., the friction contact between the wrap spring 44 and the disk part 28, are metal-to-metal contacts, which provide good heat discharge and thus make superfluous any heat storage masses, as are necessary with the organic friction linings frequently used in the prior art. The wrap spring clutches, which provide a self-reinforcing effect due to spring contraction as a result of torque introduction, can also be constructed as wet-running clutches, without design changes other than sealing measures being required. The interior 26 already forms a tight radially outward seal in the area where the wrap spring 44 is arranged. Because the individual components can be produced from economical materials, e.g., sheet metal, and because no expensive friction linings are used, the wrap spring clutch according to the invention can be economically built.

It should be noted that the depicted use of a single-threaded wrap spring is only an example. For example, two or more interested wrap springs that form a multi-threaded wrap spring arrangement could also be provided. The cross-section of the wrap spring, which is generally constructed of spring wire, can be round or angular. At the same time, due to the flexibility of the wire supported on the circumferential surfaces, a damping effect is attained for rotary vibrations arising in the drive train. All of these advantages are also provided in the embodiments described below.

Figure 6:
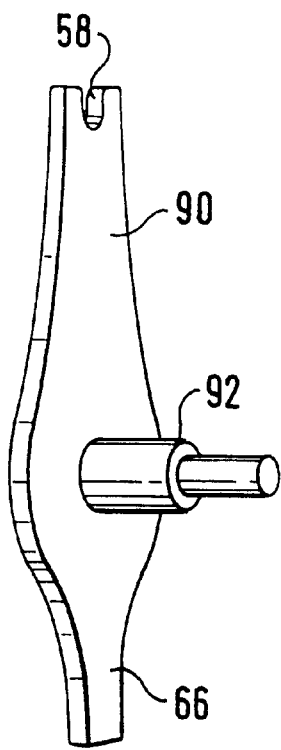
FIG. 6 shows a disengagement organ embodied as a disengagement lever.

FIG. 6 shows a disengagement lever 90 as the disengagement organ. Like the bearing bolt 60 described above, the disengagement lever 90 is held in rotatable fashion on the housing part 20 by a rotary bolt 92 and has, in the radially outer area, a notch 58 for interaction with the wrap spring 44. The activation of the disengagement lever 90 is again carried out via the operating element 70, as shown in FIGS. 1 through 4, and the circumferential grooves 68 thereof. Here, too, it is advantageous that during operation, no permanent sliding contact exists between a radial projection 66, which forms the activation section of the disengagement lever 90, on the one hand, and the operating element, on the other, as is the case in the prior art.

The interaction of the disengagement ring element 50 or the disengagement lever 90 with the operating element 70 allows very precise activation of these disengagement organs to be obtained without substantial play or substantial dead travel.

Figure 7:
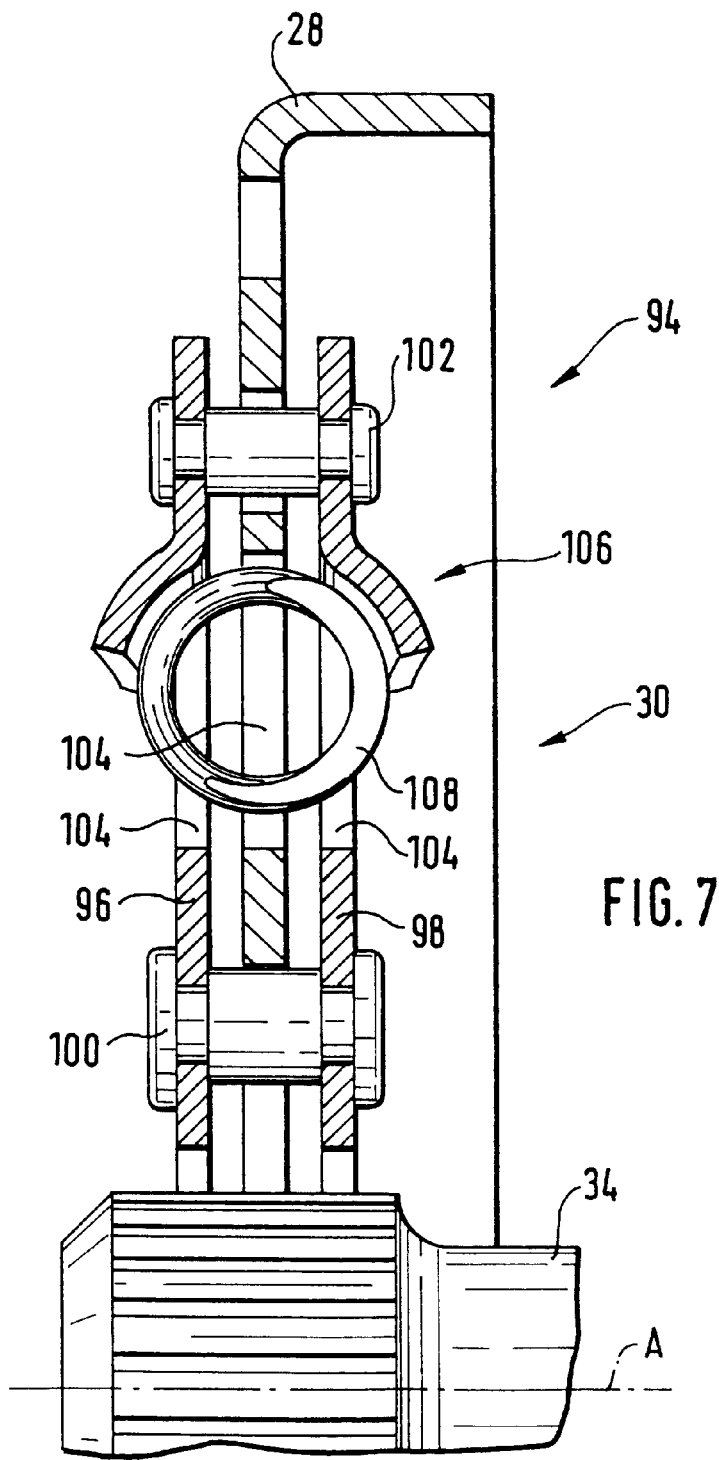
FIG. 7 shows a torsional vibration damper integrated into a component of the wrap spring clutch.

FIG. 7 shows an alternative embodiment of the second component 30, in which the disk part 28 constitutes a central disk of a torsional vibration damper 94. Cover disk parts 96, 98 of the torsional vibration damper 94 are securely connected to each other by bolts 100, 102, which penetrate circumferential openings in the disk part 28 and, together therewith, form rotational distance limits. In a known manner, both the cover disk parts 96, 98 and the disk part 28 have spring windows 104, wherein are arranged torsional spring units 106, each of which comprises at least one torsional spring 108 and which interact with the spring windows 104. On the radial inside, the cover disk parts 96, 98 are connected in rotation-proof fashion to the gear input shaft 34, and can be axially moved relative thereto. However, it is preferable to also maintain an axially fixed connection between the second component 30 and the gear input shaft, so as to obtain a defined position of the second component 30 relative to the wrap spring 44.

The embodiment in FIG. 7 makes it possible to effectively damp torsional vibrations occurring in the drive train. Because the area of interaction with the wrap spring 44 is arranged on the radial outside, a large radial space is available for the torsional vibration damper 94. This is not the case in conventional clutches, which, in addition, have friction disks.

Figure 8:
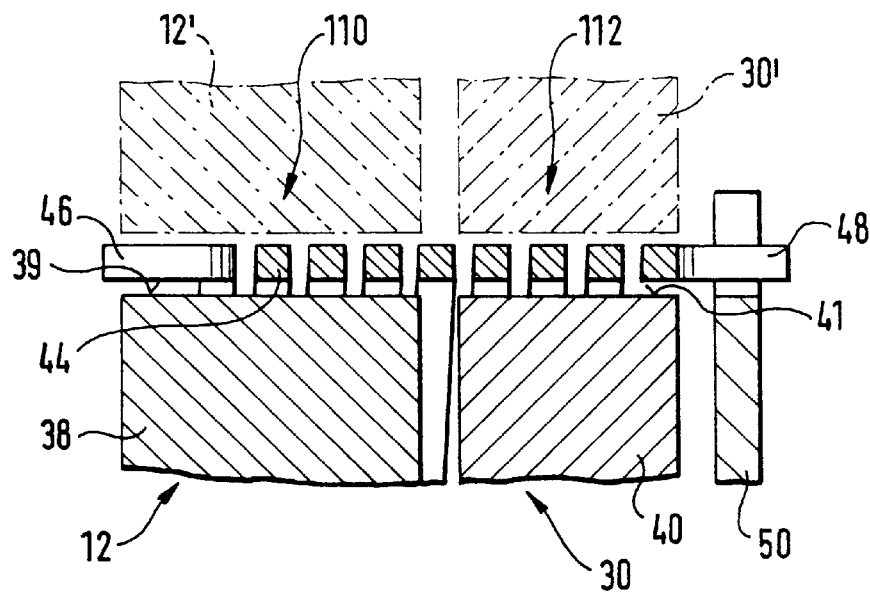
FIG. 8 is a partial longitudinal sectional view of an alternative embodiment of the wrap spring clutch according to the invention.

FIG. 8 shows an embodiment in which the wrap spring 44 or the wrap spring arrangement is in flexible contact with both the first component 12 and the second component 30, so as to avoid an overload in the area where the wrap spring 44 is connected to the first component 12. In other words, the wrap spring 44 wraps, with a first spring section 110, around the outer circumferential surface 39 of the cylindrical area 38 of the first component 18 and, with a second spring section 112, also wraps around the outer circumferential surface 41 of the cylindrical section 40 of the second component 30. In the engaged state of the clutch, the wrap spring 44 is thus in flexible engagement with both components 12, 30, so that torque is transmitted essentially completely via the friction-locking engagement of the wrap spring 44 with the two components 12, 30. With dashed lines, FIG. 8 indicates that the components 12, 30 can also be arranged radially outside of the wrap spring 44, as shown at 12', 30'. That is, in the arrangement shown here, the circumferential surface that interacts with the wrap spring is an inner circumferential surface of the respective annular components 12', 30', and the wrap spring 44, in its normal state, expands radially outward. For disengagement, the wrap spring 44 is moved by the disengagement ring element 50 in the circumferential direction in such a way as to elevate radially inward from the inner circumferential surface of the second component 30'. It should be pointed out that such an embodiment is also possible with all of the other embodiments that exist in connection with the present invention.

Figure 9:
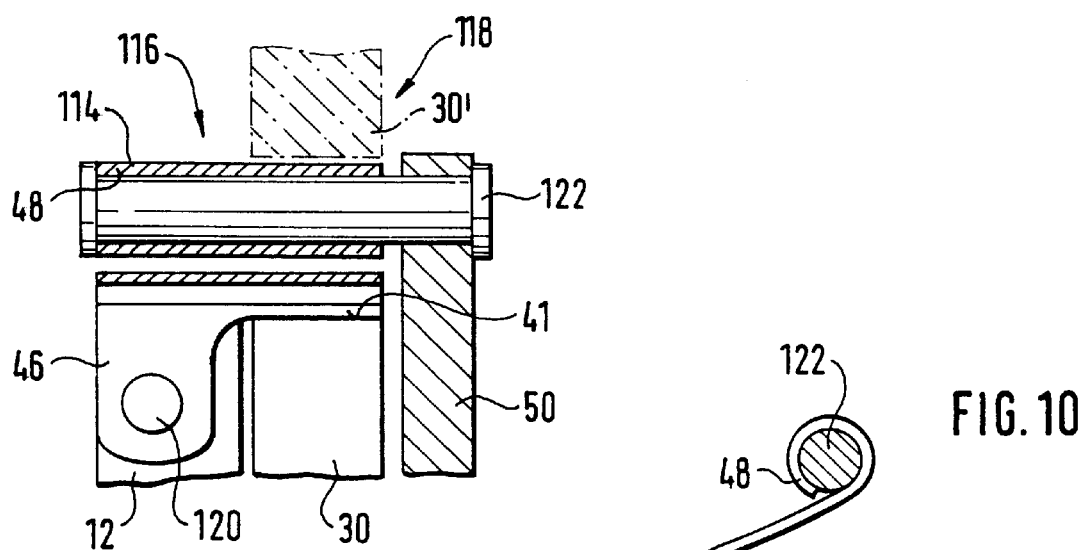
FIG. 9 is a partial longitudinal sectional view of a further alternative embodiment of the wrap spring clutch.
Figure 10:
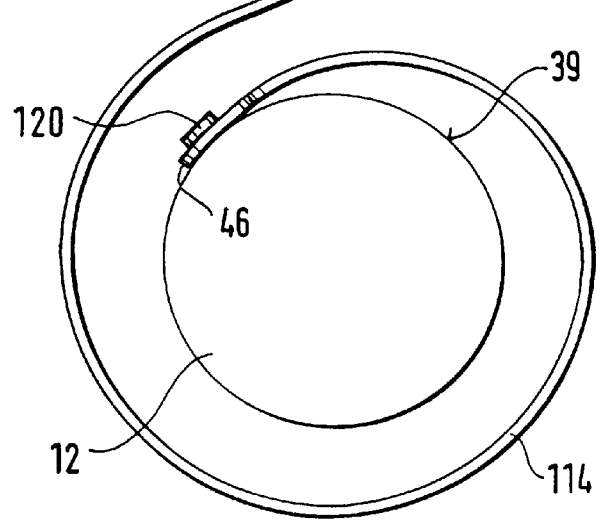
FIG. 10 is an axial view of the arrangement shown in FIG. 9.

FIGS. 9 and 10 show an embodiment in which, instead of a coil-spring arrangement, a spiral-spring arrangement with a wrap spring 114 embodied in a spiral-like manner is provided. The wrap spring 114, with a first axial section 116, surrounds a circumferential surface of the first component 12 and, with a second wrap spring section 118, also surrounds a circumferential surface of the second component 30. In the area of its first end 46, the wrap spring 114 is secured to the first component 12 by a bolt 120; in the area of its second end 48, the wrap spring 114 is connected to a bolt 122 secured to the disengagement organ, e.g., the disengagement ring element 50. The wrap spring 114 is again embodied in such a way that it has a tendency to contract in its normal state, so as to rest on the axially flush circumferential surfaces 39, 41 of the first and second components 12, 30 and to establish between them a rotary connection state that, because the wrap spring wraps completely around the two components, is not reinforced by either a self-locking or a self-contracting effect. To detach the engagement, the end 48 is again moved, by the rotation of the disengagement ring element 50, against the contraction direction of the wrap spring 114.

In such an embodiment, the entire wrap spring arrangement or wrap spring clutch can be embodied with extremely slight axial extension, while a reliable connective state can nonetheless be obtained.

It should be noted that even with such an embodiment, the different components can be arranged on the radial outside, as shown in conjunction with the second component at 30'. The spring 114 is again embodied in such a way that it has the tendency to radially expand.

Figure 11:
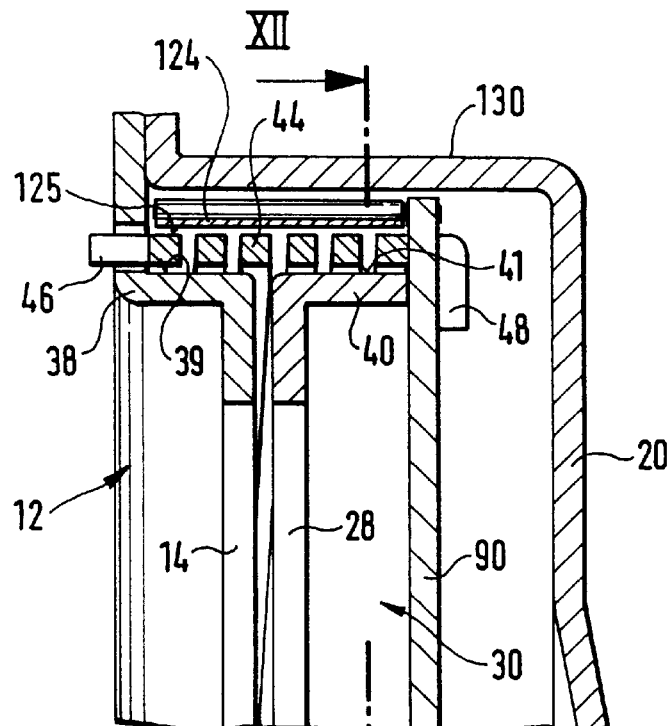
FIG. 11 is a further alternative embodiment of a wrap spring clutch.
Figure 13:
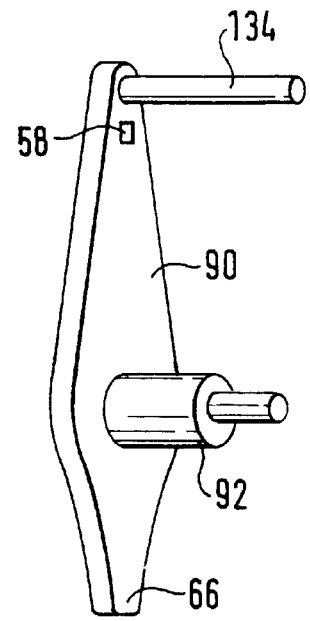
FIG. 13 shows a disengagement organ embodied as a disengagement lever for the wrap spring clutch in FIGS. 11 and 12.
Figure 12:
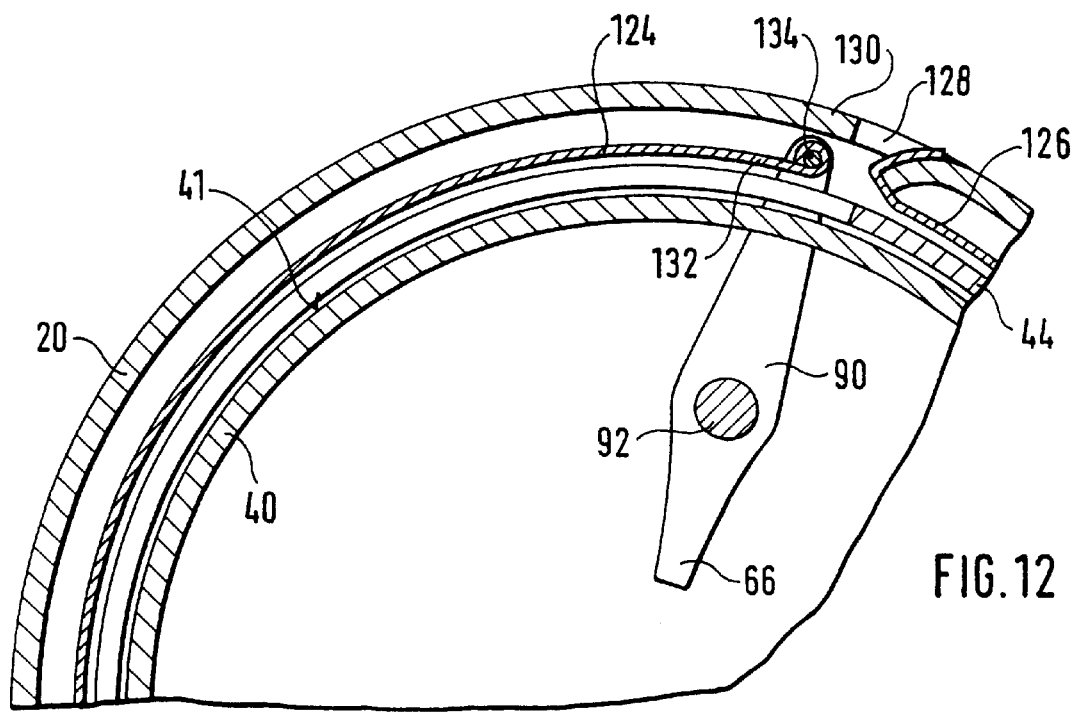
FIG. 12 is a partial cross-sectional view along Line XII—XII in FIG. 11.

FIGS. 11 through 13 show a further modification of the wrap spring clutch according to the invention. The wrap spring clutches known from the prior art suffer from the problem that they can transmit a torque substantially only in one direction, namely the direction in which the self-locking effect occurs. Upon torque introduction in the opposite direction, the spring spreads out, and its connecting effect is lost; one of the dangers thereby created is that of damage to the spring. To avoid such damage, for example, it is possible to provide freewheel devices that are connected in series to the wrap spring clutch and permit torque transmission or introduction to the wrap spring clutch only in one direction. The embodiment shown in FIGS. 11 through 13 can also be used in motor vehicles with freewheel devices or other devices that prevent the introduction of a torque in an undesired direction. As the drawings show, on the radial outside, the wrap spring 44 is provided with a substantially annular support element 124, which extends substantially completely around the wrap spring 44. In the axial direction, the support ring element 124 extends substantially completely past the wrap spring 44.

As FIG. 12 shows, the support element 124 is connected in rotation-proof fashion by its first end 126 to the housing part 20, in that a curved area at the end 126 engages into an opening 128 in a substantially cylindrical section 130 of the housing part 20. The support element 124 is also curved at the opposite end 132, and surrounds a carrier journal 134, which extends axially on the disengagement lever 90. As FIG. 13 shows, the disengagement lever 90 again has a recess 58, into which the wrap spring 44 engages with its end 48.

The support element 124 is arranged so that when the wrap spring clutch 10 is in the engaged state, the support element 124 rests, with a support surface 125, on an outer circumferential surface of the wrap spring 44. If the torque direction is reversed, the wrap spring 44, which is now loaded not to tension, but to thrust, can rest to the radial outside on the support element 124, so that the danger of deformation of the wrap spring 44 can be avoided.

In this embodiment, the recess 58 is embodied so that the end 48 of the wrap spring 44 engaging therein has a slight play in the circumferential direction. As a result, during a disengagement process, when the disengagement lever 90 is initially pivoted, the disengagement element 124 relaxes, i.e., the disengagement lever 90 in FIG. 12 pivots in the counter-clockwise direction, so that the disengagement element 124 elevates, at least in some areas, from the wrap spring 44 and permits radial expansion of the latter. Only after the disengagement element 124 elevates from the wrap spring 44 does the end 48 come into carrier engagement with a wall of the recess 58 to be rotated in the circumferential direction against the prestress effect of the wrap spring 44. Thus, in this state, in which the wrap spring 44 expands, its expansion is not prevented by the support element 124, which is expanding radially due to intrinsic prestress or to the thrust movement of the disengagement lever 90.

During the engagement process, the same process occurs in the reverse direction, i.e., first, the wrap spring 44 is brought to rest on the cylindrical section 38 of the second component 30, and then the support element 24 is brought to rest on the wrap spring 44.

It should be pointed out that a suitable arrangement is also possible when the components 12, 30 are arranged radially outside of the wrap spring 44. In this case, the support element 124 must again be arranged on the opposite radial side of the wrap spring 44, namely, the radially inner side thereof.

Furthermore, it should be noted that, instead of the disengagement lever 90, a disengagement ring element or a different disengagement organ can be provided.

Figure 14:
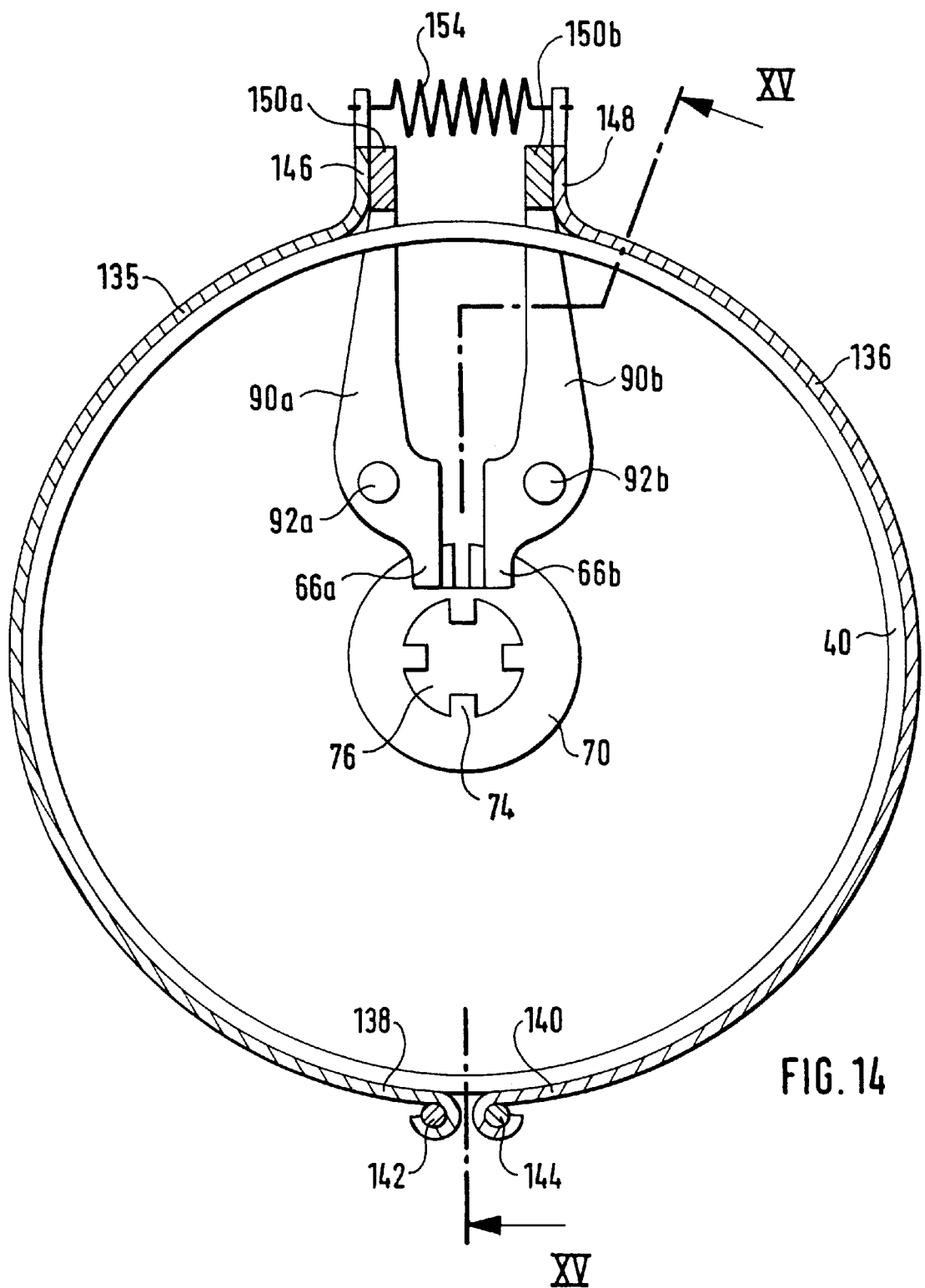
FIG. 14 is a further alternative embodiment of a wrap spring clutch according to the invention.

FIGS. 14 and 16 show a further embodiment, in which the undesired expansion of the wrap spring arrangement upon reversal of the torque introduction direction can be avoided.

In the embodiment in FIGS. 14 through 16, the wrap spring arrangement has two wrap spring parts 135, 136. These are rotatably held on the first component in the area of their first ends 138, 140 by pivot bolts 142, 144, or the like. In the area of their second ends 146, 148, the two spring parts 135, 136 curve radially outward away from the cylindrical section 40 of the second component 30. In the area between the ends 146, 148, there are axially extending sections 150a, 150b of two disengagement levers 90a, 90b, which are attached pivotably to the housing part 20 by pivot bolts 92a, 92b. With their inward projections 66a, 66b, the disengagement levers 90a, 90b engage into an axially narrowing funnel-shaped outer circumferential recess 152 of the operating element 70. In FIG. 15, the narrower area of the recess 152 is arranged on the right side of the operating element 70, while the wider area is arranged on the left side of the operating element 70.

FIG. 14 also shows that a prestress element acts between the ends 146, 148, e.g., a prestress spring 154 or the like, via which the spring parts 135, 136 are pressed into contact with the cylindrical section 40 of the second component 30 or the cylindrical section 38 of the first component 12.

The function of this embodiment is as follows: In the engaged state, the spring parts 135, 136 are pressed into contact with the cylindrical sections 38, 40 via the prestress force of the spring 154. Although the spring parts 135, 136 extend only in circumferential areas, the wrapping effect with self-reinforcement again occurs. Depending on its transmission direction, torque is transmitted via one of the spring parts 135, 136. If, for example, the cylindrical section 40 of the second component 30 in FIG. 14 is turned in the counter-clockwise direction, and the bolts 142, 144 connected securely to the first component are thereby held in place, the torque will be transmitted substantially by the spring part 136.

To embody the torque connection between the two components 12, 30 as strongly as possible, the spring parts 135, 136 together extend substantially along the entire circumference of the components 12, 30, i.e., together have an angular extension of almost 360 degrees.

To disengage the clutch, the operating element 70 in FIG. 15 is moved to the left, for example, by means of a clutch release lever that pressurizes the disengagement bearing 86. The two projections 66a, 66b then come to rest on the respective slanted surfaces 156, 158 of the recess 152 and are brought toward each other in the circumferential direction with a spreading movement of the disengagement lever 90a, 90b in its radially outer area. The spring parts 135, 136 are also elevated from the circumferential surfaces, so that the rotary connection state is ended. After the release of the disengagement bearing, each of the disengagement levers 90a, 90b is again pivoted back due to the prestress force of the spring 154, whereby the projections 66a, 66b, by sliding on the slanted surfaces 156, 158, push the operating element 70 in FIG. 15 back to the right into its initial position.

In such an embodiment, the undesired deformation of an area of the wrap spring arrangement can be avoided. It should also be pointed out that a suitable embodiment is possible when the circumferential surfaces provided for interaction with the wrap spring arrangement are seated radially outside of the wrap spring, and the wrap spring arrangement presses radially outward to establish the connection state.

When the deformation of the wrap spring during a reversal in rotational direction can be prevented in a deliberately adjustable fashion, there is overload protection, for example, in the case of thrust impacts.

Figure 17:
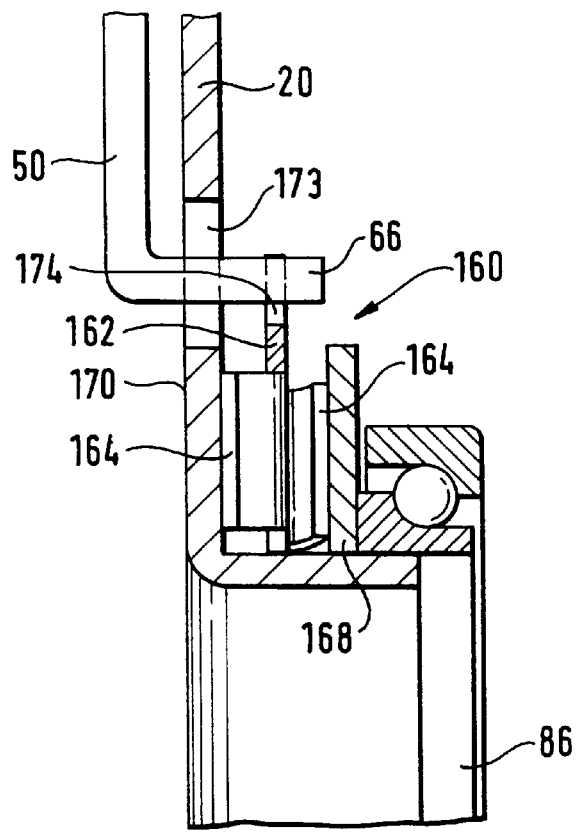
FIG. 17 is a partial longitudinal sectional view of a further alternative embodiment of a wrap spring clutch, showing an alternative embodiment of an operating arrangement.
Figure 18:
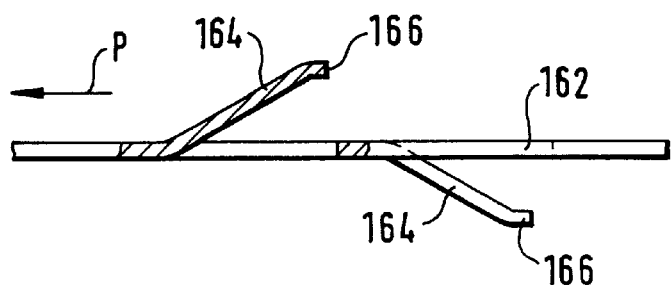
FIG. 18 is a radial view of a section of the operating arrangement in FIG. 17.
Figure 19:
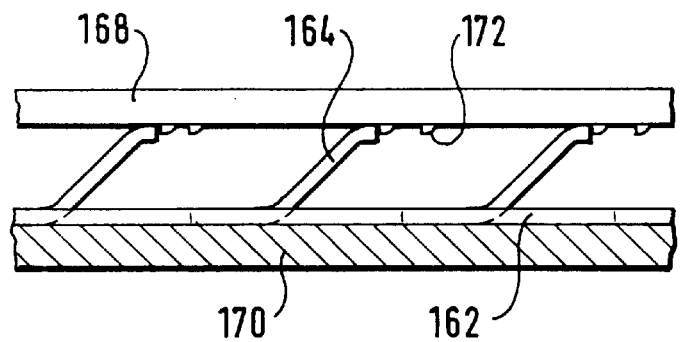
FIG. 19 shows an alternative embodiment of an operating arrangement in interaction with a disengagement force production arrangement.

FIGS. 17–19 show an alternative embodiment of an operating arrangement 160. The operating arrangement 160 comprises an element 162, which is embodied in the manner of a ring disk and from which a plurality of tongues 164 curve, one after the other, in the circumferential direction. As FIG. 18 shows, consecutive tongues 164 are curved in the same circumferential direction, but in the opposite axial direction. The tongues 164 rest with their free ends 166 on a ring 168 pressurized by the disengagement bearing 86, which is axially movable—but not rotatable—relative to the housing part 20, or on a radially inner section 170 of the housing part 20. In the area of support, it is thereby possible to provide a positive-locking engagement in the circumferential direction between the ends 166 of the tongues 164 and the ring 168 or housing part 20, as schematically indicated by projections 172 in FIG. 19.

On the radial outside, the element 162 is in engagement with the disengagement ring element 50. The projections 66, which are now axially curved, penetrate an opening 172 in the housing part and, at the same time, engage into recesses 174 of the element 162. As a result, the disengagement ring element 54 is connected in a substantially rotation-proof fashion to the element 162.

If the disengagement bearing 86 in FIG. 17 is moved to the left to disengage the clutch, the tongues 164 are compressed axially. Because the tongues 164, due to their positive-locking or friction-locking interaction, are connected to the ring 168 or the section 170 of the housing part 20 in rotation-proof fashion at least in one direction, the tongues 164 cannot, upon this axial deformation, escape in the area of their free ends 166 in the circumferential direction. Therefore, a rotary movement of the element 162 is produced in the direction of an arrow P in FIG. 18, whereupon the disengagement ring element 50 is taken along.

Thus, in such an embodiment, to convert the axial movement of the disengagement bearing 86 into a rotary movement of the disengagement ring element 50 (or of a disengagement lever), it is possible to dispense with the friction-locking interaction of any components, so that the force required for disengagement of the clutch can be clearly reduced.

It should be pointed out that such tongues 164 can also be provided directly on the disengagement ring element 50, so that the disengagement organ and the operating organ can be incorporated into one component. In such an embodiment, a punch-type passageway through the housing part 20 would have to be provided, via which the axial movement of the disengagement bearing 86 could be transmitted to the disengagement ring element 50 or the tongues 164 thereof.

FIG. 19 shows a modification of FIGS. 17 and 18, in which the tongues 164 are provided only on one axial side of the element 162. The element 162 then rests on section 170 of the housing part 20 and slides on this part when a relative movement occurs.

The embodiments in FIGS. 17 through 19 have the advantage that a conventional disengagement system can be used, as is used, for example, for disk clutches. Furthermore, because additional axially movable parts are dispensed with, i.e., the operating element 70 of the previous embodiments, further reduction in the axial structural space of the clutch is possible.

The invention is not limited by the embodiments described above which are presented as examples only but can be modified in various ways within the scope of protection defined by the appended patent claims.

I claim:

1. A wrap spring clutch, comprising:
   a first component rotatable around a rotary axis;
   a second component rotatable around the rotary axis;
   a wrap spring arrangement having a first spring section and a second spring section, the wrap spring arrangement being held on one of the first and second components in a substantially rotation-proof fashion so that the first spring section is one of at connective rest and bringable into connective rest on a circumferential surface of the first component for torque transmission, and the second spring section is one of at connective rest and bringable into connective rest on a circumferential surface of the second component so as to establish a rotary connection between the first and second components;
   disengagement means connected to the wrap spring arrangement for selectively establishing and eliminating action of the wrap spring arrangement on the second component, the disengagement means including an annular disengagement element rotatable around the rotary axis so as to establish and eliminate the act of the wrap spring arrangement on the second component;
   operating means for operating the disengagement element, the operating means including an operating organ movable by a disengagement force production device in a direction of the rotary axis so that an activation surface of the operating organ pressurizes an activation section of the disengagement element; and
   rotary disconnection bearing means arranged between the operating organ and the disengagement force production device for rotary disconnection of the disengagement force production device and the operating organ.

2. A wrap spring clutch as defined in claim 1, wherein the wrap spring arrangement has a spring end near the first spring section that is held in a substantially rotation-proof fashion on the first component.

3. A wrap spring clutch as defined in claim 2, wherein the first component has a recess, the spring end of the wrap spring arrangement being arranged to engage in the recess of the first component.

4. A wrap spring clutch as defined in claim 1, wherein the circumferential surface of the first component and the circumferential surface of the second component are substantially aligned relative to each other in an axial direction.

5. A wrap spring clutch as defined in claim 1, wherein the wrap spring arrangement includes at least one wrap spring formed in a coil-like manner.

6. A wrap spring clutch as defined in claim 1, wherein the wrap spring arrangement includes a wrap spring formed in a spiral-like manner.

7. A wrap spring clutch as defined in claim 6, wherein the wrap spring extends around the rotary axis with an angular extension of more than 360 degrees.

8. A wrap spring clutch as defined in claim 1, wherein the annular disengagement element is arranged so as to be rotatable at least relative to the first component.

9. A wrap spring clutch as defined in claim 1, and further comprising a housing connected in rotation-proof manner to the first component, the annular disengagement element being connected to the housing so as to be rotatable around the rotary axis.

10. A wrap spring clutch as defined in claim 1, wherein the operating organ is substantially rotation-proof relative to the first component.

11. A wrap spring clutch as defined in claim 1, wherein the activation surface is on an outer circumferential surface of the operating organ and runs in a coil-like manner.

12. A wrap spring clutch as defined in claim 11, wherein the outer circumference of the operating organ has a substantially thread-like depression with a side wall that forms the activation surface.

13. A wrap spring clutch as defined in claim 1, and further comprising a support arrangement having a support surface, the support arrangement being arranged directly adjacent to the wrap spring arrangement on a radial side of the wrap spring arrangement opposite to the circumferential surface of the second component and, as applicable, the first component.

14. A wrap spring clutch as defined in claim 13, wherein the support arrangement is configured so that at least in an engaged state of the wrap spring clutch, the support surface rests on the wrap spring arrangement.

15. A wrap spring clutch as defined in claim 14, wherein the support arrangement is configured so that in a disengaged state of the wrap spring clutch, resting contact of the support arrangement on the wrap spring arrangement is eliminated at least in some areas.

16. A wrap spring clutch as defined in claim 15, wherein the annular disengagement element is arranged so as to be rotatable at least relative to the first component and further comprising a housing connected in rotation-proof manner to the first component, the annular displacement element being connected to the housing so as to be rotatable around the rotary axis the disengagement means being operative to eliminate the resting contact of the support arrangement on the wrap spring arrangement.

17. A wrap spring clutch as defined in claim 16, wherein the disengagement means is operative to initially eliminate, upon disengagement of the wrap spring clutch, the resting contact of the support arrangement on the wrap spring arrangement at least in some areas, and subsequently eliminate the action state of the wrap spring arrangement on the second component.

18. A wrap spring clutch as defined in claim 16, wherein the support arrangement includes a support element that extends in the circumferential direction substantially completely around the wrap spring arrangement.

19. A wrap spring clutch as defined in claim 1, wherein at least one of the first and second components includes a torsional vibration damping arrangement.

* * * * *